(12) United States Patent
Ciochina et al.

(10) Patent No.: US 9,467,321 B2
(45) Date of Patent: Oct. 11, 2016

(54) METHOD, DEVICE AND COMPUTER PROGRAM FOR TRANSMITTING DATA TO AT LEAST ONE RECEIVER, AND METHOD, DEVICE AND COMPUTER PROGRAM FOR RECEIVING DATA TRANSMITTED BY A SOURCE

(71) Applicant: MITSUBISHI ELECTRIC CORPORATION, Tokyo (JP)

(72) Inventors: Cristina Ciochina, Rennes (FR); Loic Brunel, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/651,947

(22) PCT Filed: Dec. 5, 2013

(86) PCT No.: PCT/JP2013/083281
§ 371 (c)(1),
(2) Date: Jun. 12, 2015

(87) PCT Pub. No.: WO2014/112254
PCT Pub. Date: Jul. 24, 2014

(65) Prior Publication Data
US 2015/0326421 A1 Nov. 12, 2015

(30) Foreign Application Priority Data
Jan. 21, 2013 (EP) .................................... 13152015

(51) Int. Cl.
*H04L 27/20* (2006.01)
*H04L 27/34* (2006.01)
*H04L 5/00* (2006.01)
*H04L 27/26* (2006.01)

(52) U.S. Cl.
CPC ......... *H04L 27/3483* (2013.01); *H04L 5/0007* (2013.01); *H04L 27/3488* (2013.01); *H04L 27/2602* (2013.01); *H04L 27/2647* (2013.01)

(58) Field of Classification Search
CPC ........... H04L 27/2602; H04L 27/3483; H04L 27/2647; H04L 27/36; H04B 10/541
USPC .......... 375/308, 279, 261; 329/304; 332/103
See application file for complete search history.

(56) References Cited

U.S. PATENT DOCUMENTS

| 5,581,578 A | 12/1996 | De Bot |
| 7,778,335 B2 * | 8/2010 | Smallcomb ........ H04B 7/18523 370/315 |
| 8,995,295 B2 * | 3/2015 | Wulich ............... H04L 27/3461 370/252 |

(Continued)

*Primary Examiner* — Leila Malek
(74) *Attorney, Agent, or Firm* — Birch, Stewart, Kolasch & Birch, LLP

(57) ABSTRACT

The present invention concerns a method for transmitting data to at least one receiver, data being decomposed in a first and a second streams. The method comprises the steps of: —identifying, from a first number of bits of the first stream, a cluster of constellation points among clusters of constellation points of an amplitude phase shift keying constellation, each cluster of constellation points being comprised in a respective circle sector of a first type, each circle sector of the first type being spaced from another circle sector of the first type by a circle sector of a second type, all circle sectors having the same central point, —identifying, from a second number of bits of the second stream, one constellation point out of the constellation points comprised in the identified cluster, —mapping the bits used for identifying to the identified constellation point of the identified cluster of constellation points, in order to form a symbol to be transmitted, —transmitting the symbol to the at least one receiver.

13 Claims, 13 Drawing Sheets

(56) References Cited

U.S. PATENT DOCUMENTS

2005/0111590 A1* 5/2005 Fang .................... H04L 27/205 375/330

2008/0170640 A1 7/2008 Gao et al.
2013/0336649 A1* 12/2013 Essiambre ............. H04L 27/06 398/27

* cited by examiner

| | | 160 | 161 | 162 | 163 |
|---|---|---|---|---|---|
| 165 — $\theta=\pi/8$ | $\Delta=0.1226$ | 0.7251 | 0.8477 | 0.9702 | 1.0928 |
| 166 — $\theta=\pi/8$ | $\Delta=0.1958$ | 0.5542 | 0.7500 | 0.9458 | 1.1416 |
| 167 — $\theta=\pi/16$ | $\Delta=0.1915$ | 0.5615 | 0.7560 | 0.9474 | 1.1389 |
| 168 — $\theta=\pi/16$ | $\Delta=0.2585$ | 0.4040 | 0.6624 | 0.9209 | 1.1794 |

METHOD, DEVICE AND COMPUTER PROGRAM FOR TRANSMITTING DATA TO AT LEAST ONE RECEIVER, AND METHOD, DEVICE AND COMPUTER PROGRAM FOR RECEIVING DATA TRANSMITTED BY A SOURCE

The present invention relates generally to a method and a device for transmitting data to at least one receiver.

In the business of satellite communications, direct to the home television has one of the most important market shares. The market growth is mainly driven by the introduction of HDTV (High Definition TV) but recently 3DTV (3 dimension) has been introduced. In the future, multi-view 3DTV and UHDTV (Ultra High Definition TV) will follow. In order to accommodate high quality transmission, which requires high native bitrates, large transmission bandwidths are necessary.

Available spectrum lies into frequency regions sensitive to rain fading. One of the existing countermeasures for rain fades is the use of hierarchical modulations, offering different protection levels of the bits selecting a certain constellation point.

In hierarchical modulation, two separate bit streams, a "High Priority" (HP) and a "Low Priority" (LP) streams are combined onto a single modulated stream.

Receivers with good reception conditions can correctly receive both streams, while those with poorer reception conditions may only receive the "High Priority" stream. Broadcasters can target two different types of receiver with two completely different services. Typically, the LP stream is of higher bit rate, but lower robustness than the HP one.

The resulting hierarchical constellation can be separated in several clusters of constellation points, where each cluster encodes the essential information of the HP stream and the constellation points in each cluster encode the supplementary information carried by the LP stream. This characteristic imposes certain restrictions for the length of the HP and LP streams.

Let us consider a hierarchical constellation comprising $X=2^{n'}$ constellation points, and thus mapping groups of n' bits on to a constellation point. Let us assume that the constellation can be separated into $C=2^{n_1}$ clusters comprising $2^{n_2}$ constellation points each ($n'=n_1+n_2$). In the mapping process, $n_1$ bits of the HP stream identify one out of the C clusters and $n_2$ bits of the LP stream identify one constellation point out of the $2^{n_2}$ constellation points comprised in the cluster identified by the bits of the HP stream.

At the receiver side, a possibility is to decode both the HP and LP streams. Simultaneous decoding of both streams is possible, especially when the information on the cluster brings about little improvement on the decoding of the LP stream. Other decoder configurations can be used like feedback from the HP decoder to the LP decoder, or iterative decoding.

HP and LP streams are unequally protected to the errors, both due to the possibility of having different coding rates in the FEC (Forward Error Correction) codes and to the nature of the hierarchical mapping. HP and LP streams have different performance and they ensure transmission of different quality at different signal to noise ratios. For example, if in clear sky conditions the LP stream can be decoded in order to offer high quality TV reception, in rainy conditions only the HP stream can be decoded, offering basic quality TV reception.

Hierarchical modulation is implemented in some DVB standards. These standards mainly use H16QAM (hierarchical 16 Quadrature Amplitude Modulation) and H64QAM.

The present invention aims at providing a method and a device which enable to transfer data, using a hierarchical modulation stream, while maintaining a low Peak-to-Average Power Ratio on transferred signals.

To that end, the present invention concerns a method for transmitting data to at least one receiver, data being decomposed in a first and a second streams, characterized in that the method comprises the steps of:

identifying, from a first number of bits of the first stream, a cluster of constellation points among clusters of constellation points of an amplitude phase shift keying constellation, each cluster of constellation points containing the same number of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to $2\pi/C$ where C is the number of clusters, all circle sectors of the first and second type having the same central point, identifying, from a second number of bits of the second stream, one constellation point out of the constellation points comprised in the identified cluster, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, mapping the bits used for identifying to the identified constellation point of the identified cluster of constellation points, in order to form a symbol to be transmitted, transmitting the symbol to the at least one receiver.

The present invention also concerns a device for transmitting data to at least one receiver, data being decomposed in a first and a second streams, characterized in that the device comprises:

means for identifying, from a first number of bits of the first stream, a cluster of constellation points among clusters of constellation points of an amplitude phase shift keying constellation, each cluster of constellation points containing the same number of constellation points, each cluster of constellation points being comprised in a respective circle sector of a first type, each circle sector of the first type being spaced from another circle sector of the first type by a circle sector of a second type, each circle sector of the second type not comprising any constellation points and having the same central angle which is superior to null value and inferior to $2\pi/C$ where C is the number of clusters, all circle sectors of the first and second types having the same central point, means for identifying, from a second number of bits of the second stream, one constellation point out of the constellation points comprised in the identified cluster, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, means for mapping the bits used for identifying to the identified constellation point of the identified cluster of constellation points, in order to form a symbol to be transmitted, means for transmitting the symbol to the at least one receiver.

Thus, the present invention enables to transfer two streams of data in a hierarchical manner using an amplitude phase shift keying constellation while maintaining a low Peak-to-Average Power Ratio on transferred signals.

According to a particular feature, the constellation points within a cluster and on the same ring are equally distanced, and the distance is the same among constellation points within the same ring for all the clusters.

Thus, performance of the second stream can be controlled by controlling the distance between constellation points.

According to a particular feature, all the distances between two neighbouring rings are equal.

Thus, the Peak to Average Power Ratio of the resulting signal can be controlled by controlling the distance between rings.

According to a particular feature, the distance between two rings is equal to one of the distances between neighbouring constellation points on a same ring.

Thus, a trade-off performance—Peak to Average Power Ratio can be made.

According to a particular feature, the location of constellation points is obtained by:

separating the constellation points of an uniform amplitude phase shift keying constellation into clusters of constellation points, each cluster of constellation points containing the same number of constellation points, each cluster of constellation points being comprised in a circle sector, said circle sectors being contiguous, having the same central point and being separated by borders, applying an angular restriction along the borders in order to create circle sectors of the second type and circle sectors of the first type while keeping the constellation points contained in respective clusters of constellation points in the respective circle sectors of first type, modifying the ring radii according to the central angle of the circle sectors of the second type.

Thus, a non-uniform constellation ensuring unequal protection for the transmitted streams is obtained.

An uniform amplitude phase shift keying constellation contains constellation points which are placed on concentric circles of different radii, the constellation points onto each circle being evenly spaced. A non uniform amplitude phase shift keying constellation contains constellation points which are placed on concentric circles of different radii, the constellation points onto each circle being unevenly spaced.

According to a particular feature, if in the process of separating the constellation points at least one constellation point of the uniform amplitude phase shift keying constellation is comprised in two circle sectors, the method comprises a further step of allocating the at least one constellation point to one of the clusters of constellation points taking into account that each cluster of constellation point has the same number of constellation points.

Thus, the constellation can be separated into clusters containing the same number of constellation points.

According to a particular feature, the method comprises a further step of moving constellation points of one ring to at least one other ring.

Thus, a trade-off between performance and peak-to-average power ratio can be made.

According to a particular feature, the method further comprises the step of selecting one of the distances between two constellation points on the same ring as the distance between rings.

Thus, a good repartition of the constellation points within a cluster of constellation points is obtained.

According to a particular feature, one amplitude phase shift keying constellation among plural amplitude phase shift keying constellations is selected.

Thus, the parameters of the amplitude phase shift keying constellation can be adapted to the transmission conditions.

The present invention concerns also a method for receiving data transmitted by a source, data being decomposed in a first and a second streams and transferred using an amplitude phase shift keying constellation, characterized in that the method comprises the steps, executed by the receiver of:

receiving at least one symbol, determining information related to the first stream from the received symbol and from the amplitude phase shift keying constellation, the constellation being divided into clusters of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to $2\pi/C$, where C is the number of clusters, all circles sectors of the first and second types having the same central point, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, decoding data of the first stream from the information related to the first stream.

The present invention concerns also a device for receiving data transmitted by a source, data being decomposed in a first and a second streams and transferred using an amplitude phase shift keying constellation, characterized in that the method comprises the steps, executed by the receiver of:

receiving at least one symbol, determining information related to the first stream from the received symbol and from the amplitude phase shift keying constellation, the constellation being divided into clusters of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to 2π/C, where C is the number of clusters, all circles sectors of the first and second types having the same central point, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, decoding data of the first stream from the information related to the first stream.

Thus, the present invention enables to receive data, while maintaining a low Peak-to-Average Power Ratio on transferred signals.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

The characteristics of the invention will emerge more clearly from a reading of the following description of an example embodiment, the said description being produced with reference to the accompanying drawings, among which:

Figure 3A:
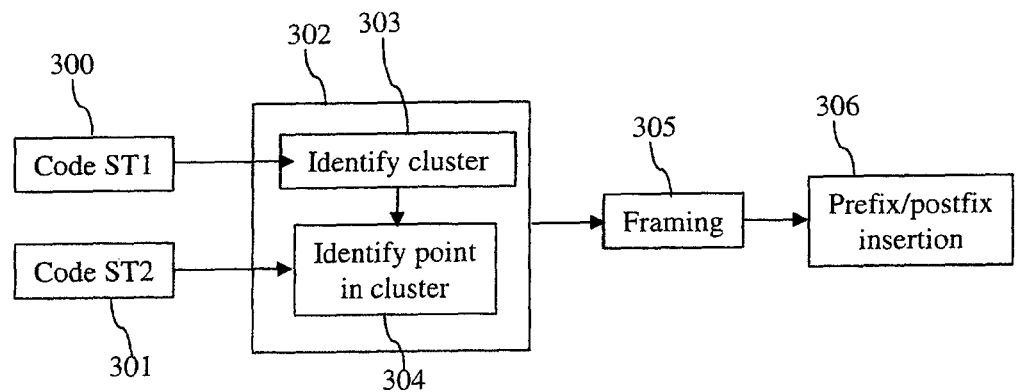
Figure 3B:
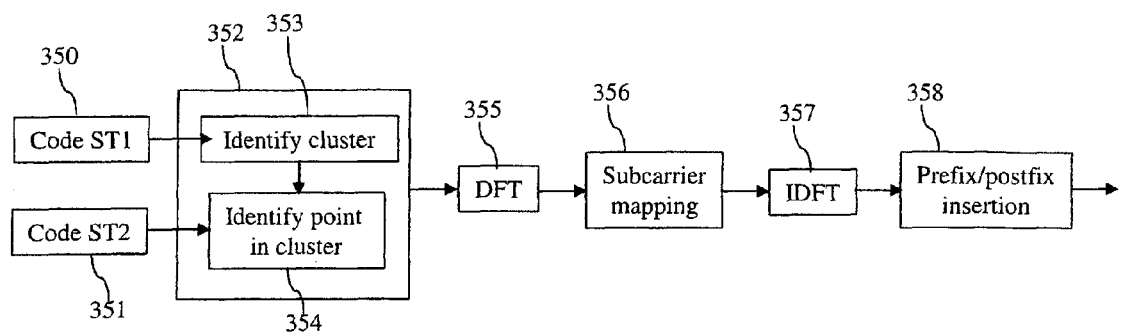
Figure 4:
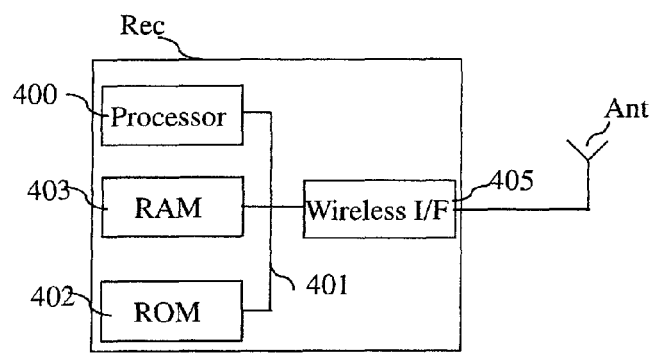
Figure 5:
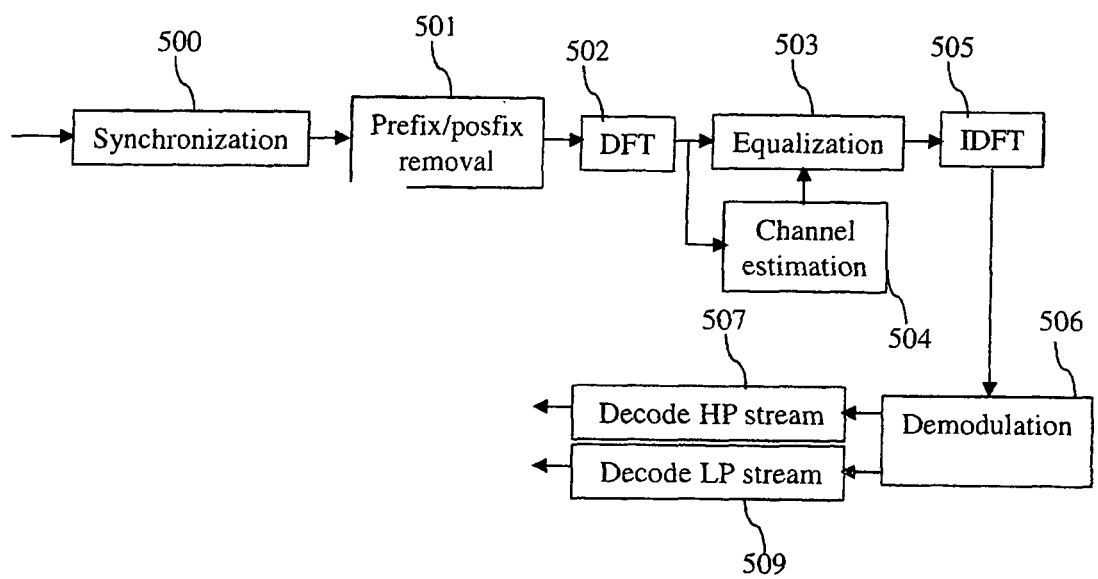
Figure 6:
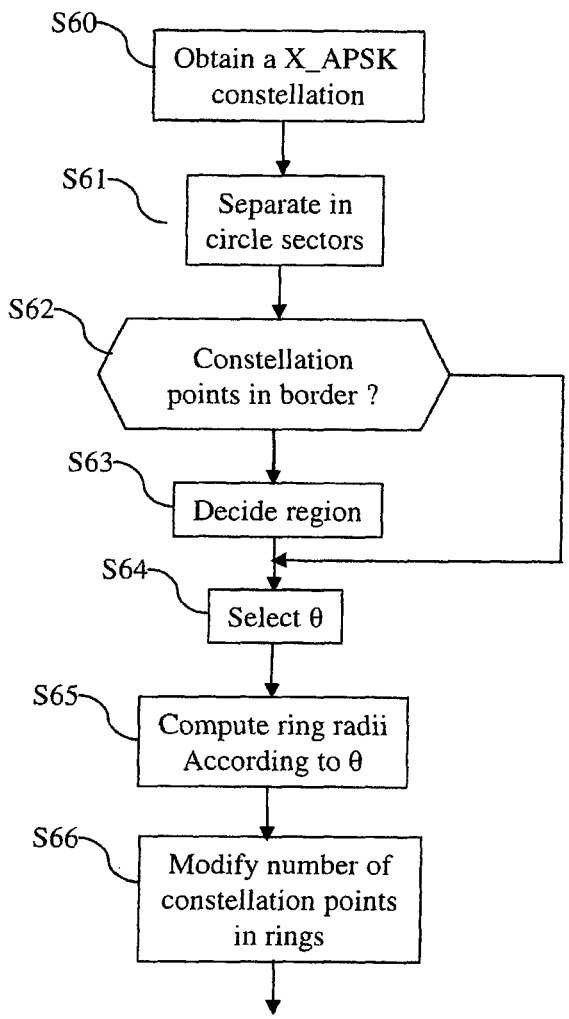
Figure 7:
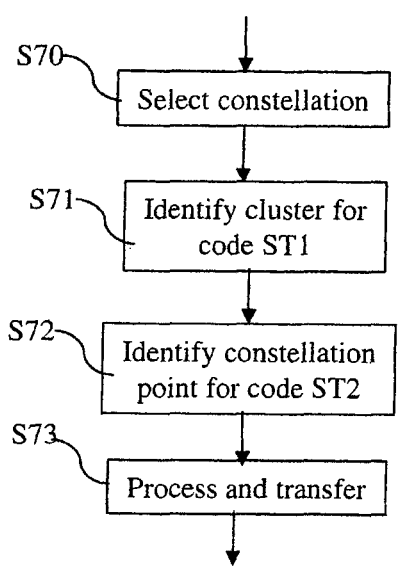
Figure 8:
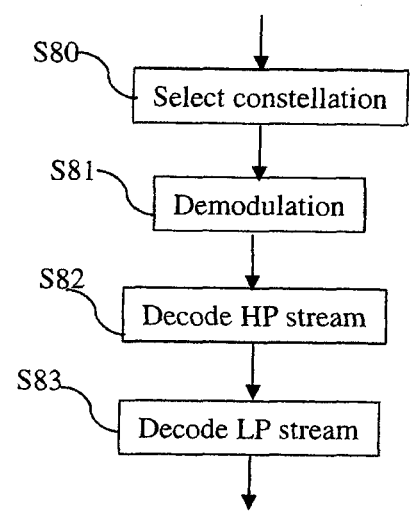
Figure 9:
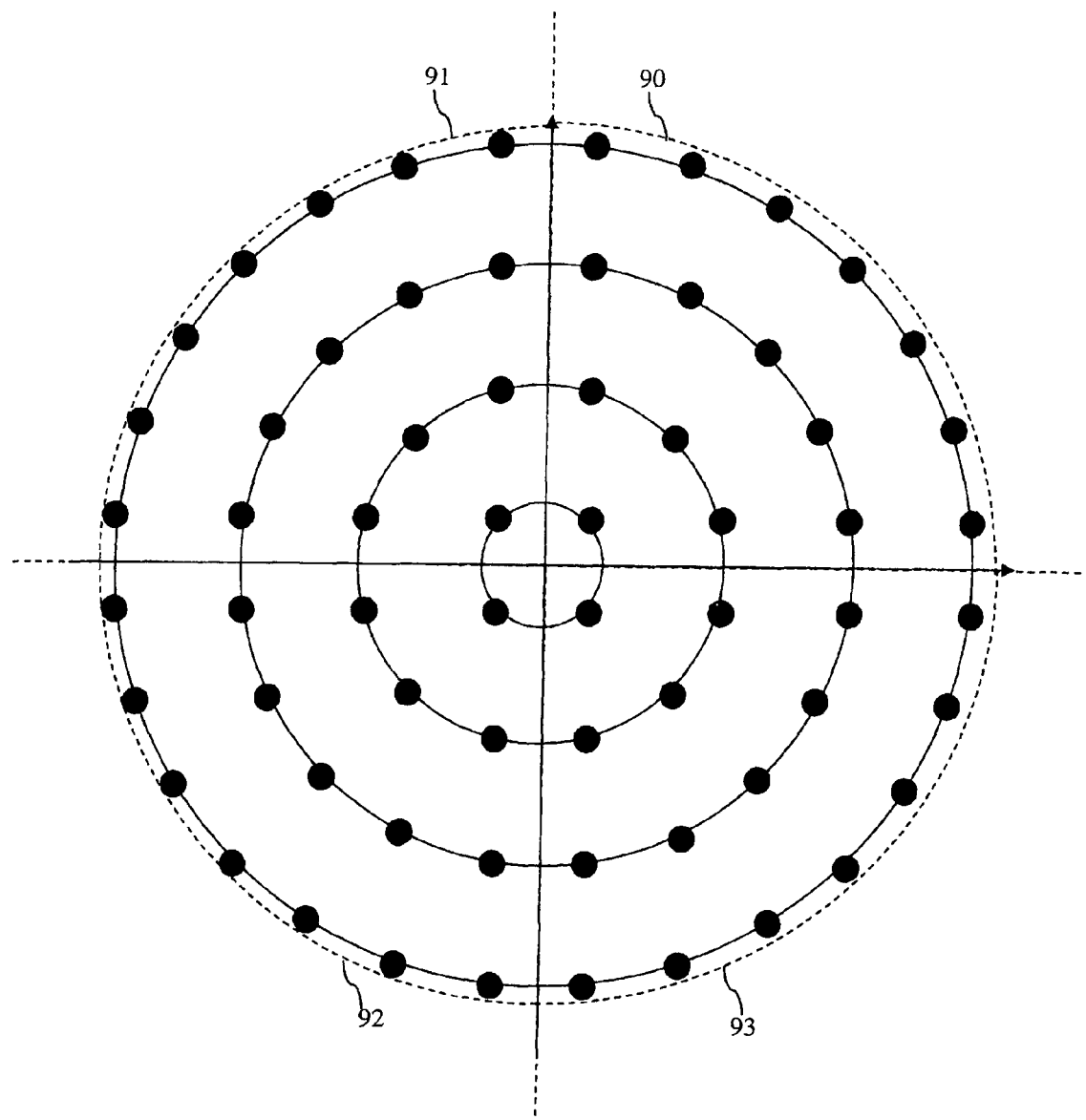
Figure 10:
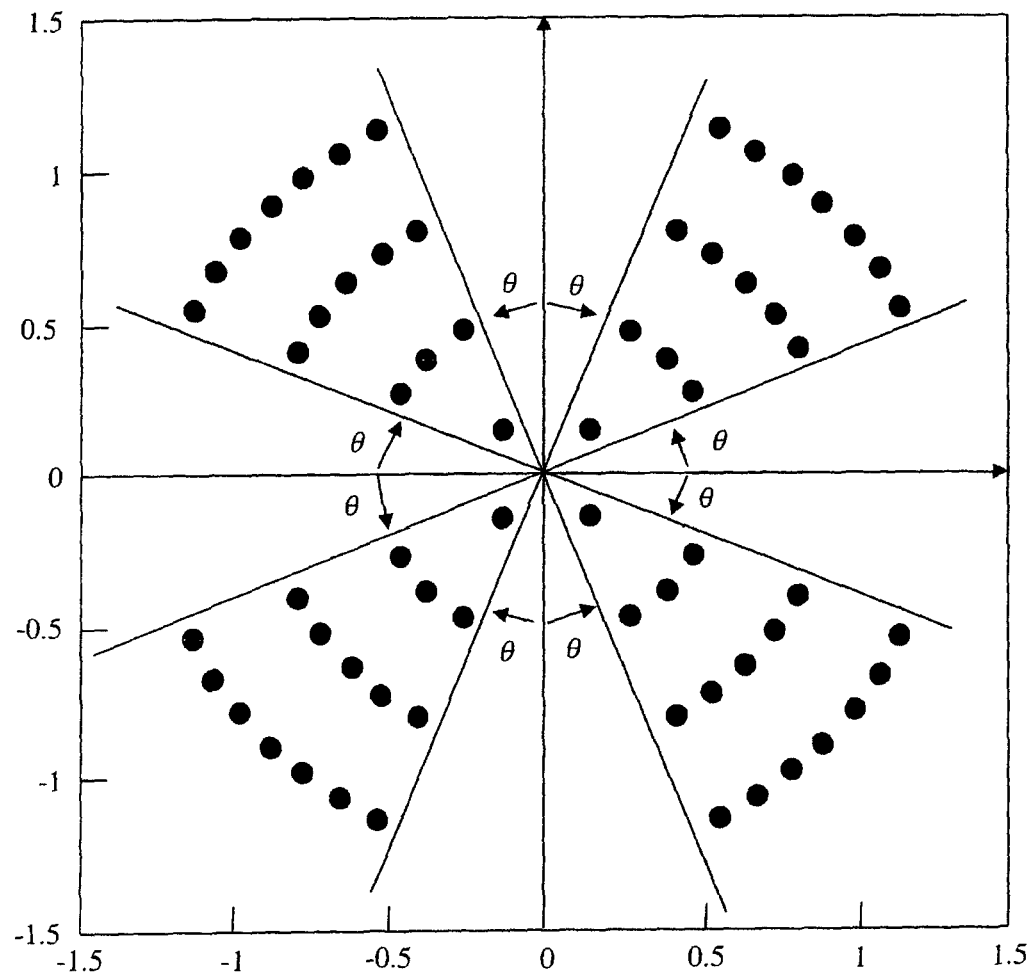
Figure 11:
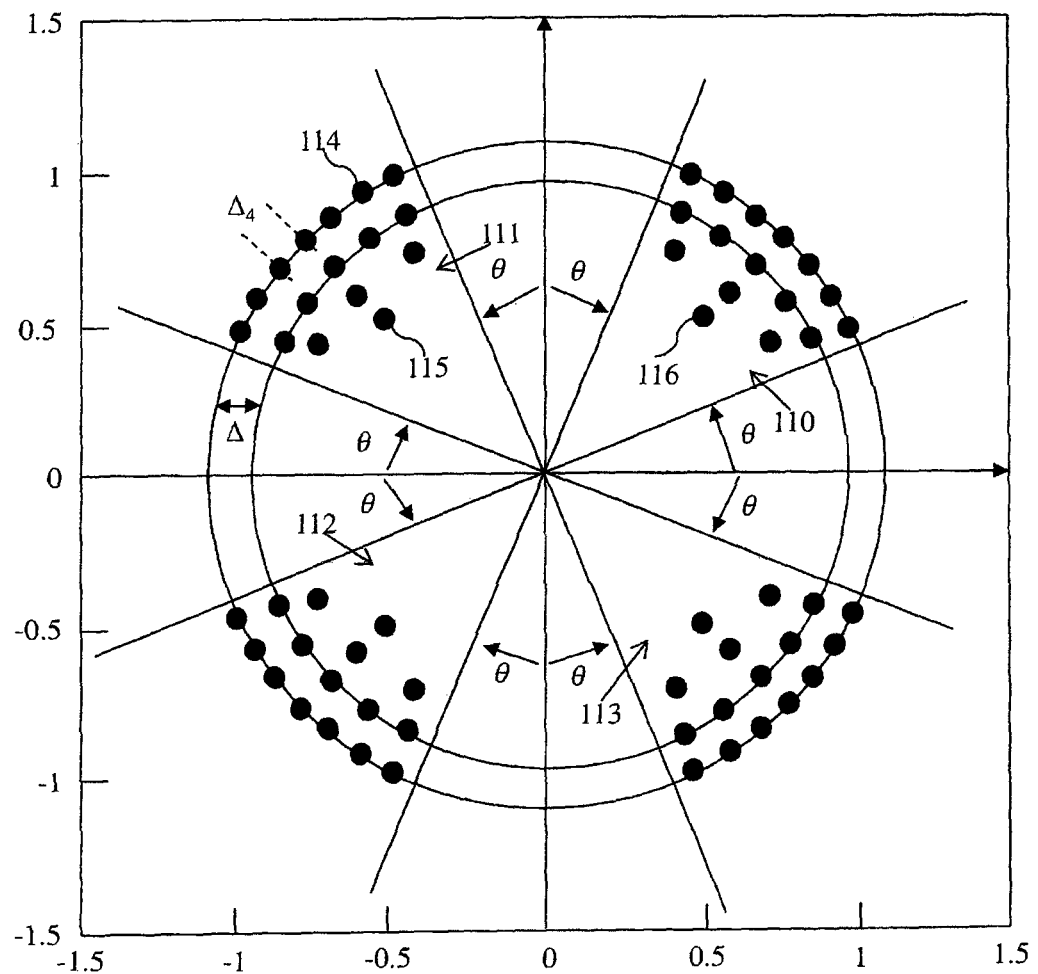
Figure 12:
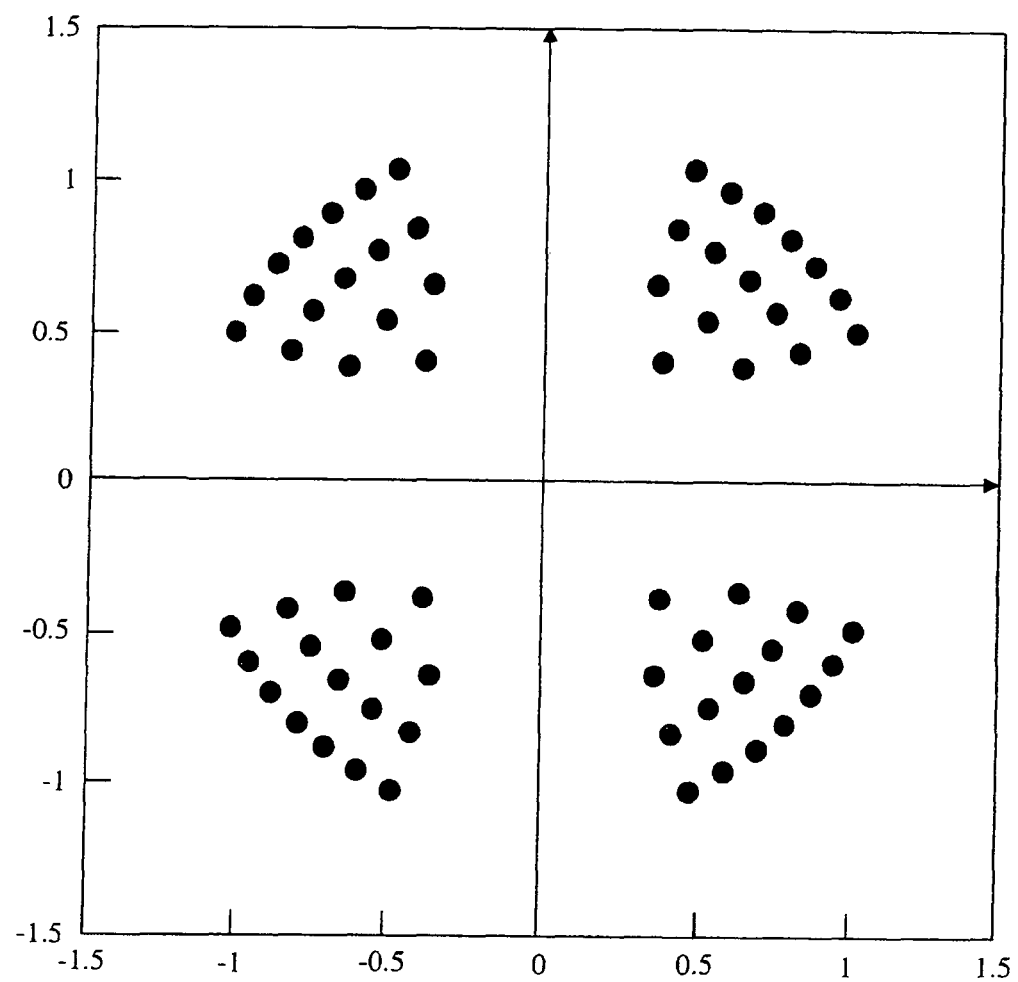
Figure 13:
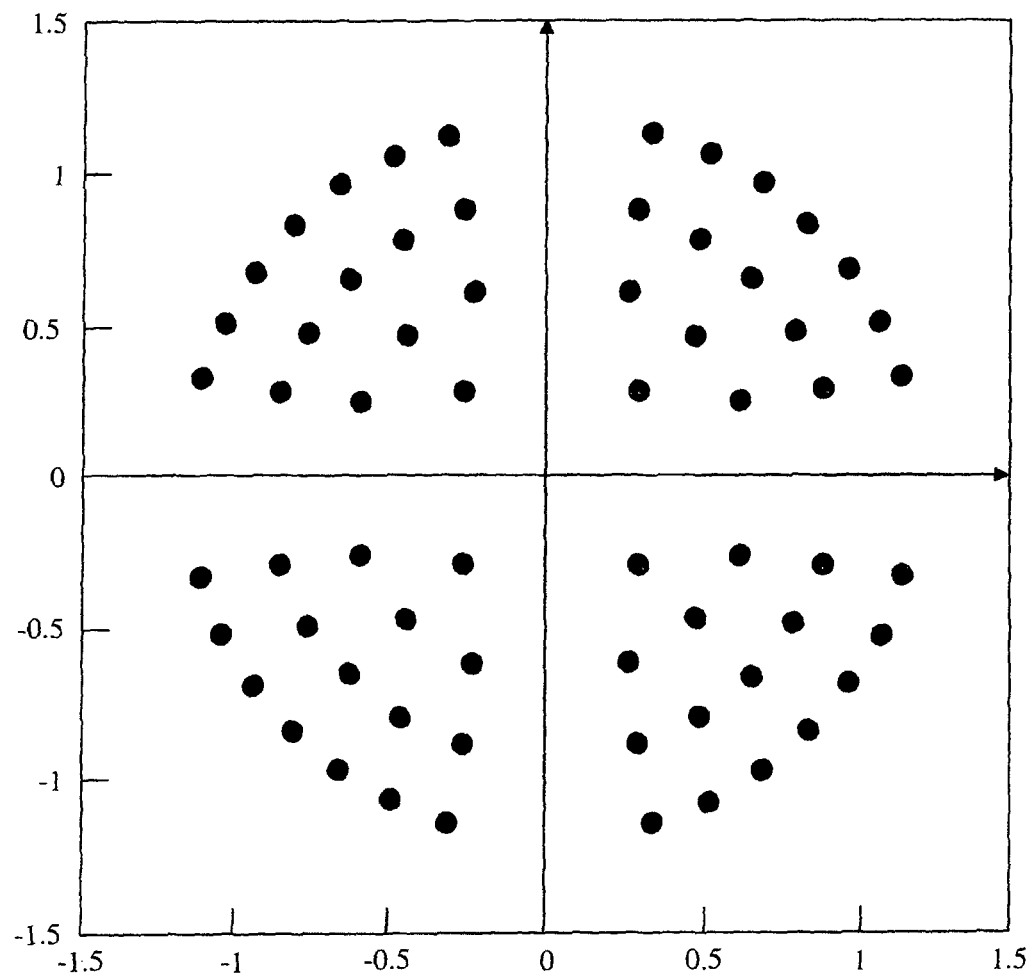
Figure 14:
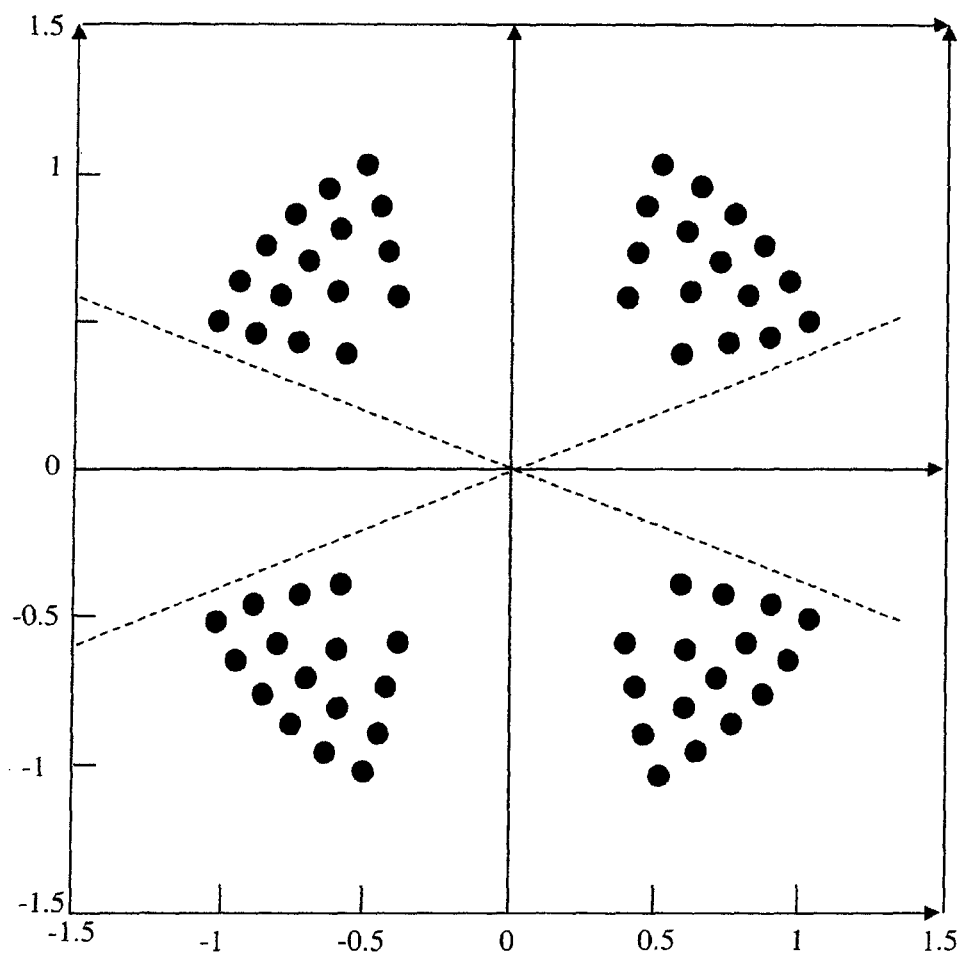
Figure 15:
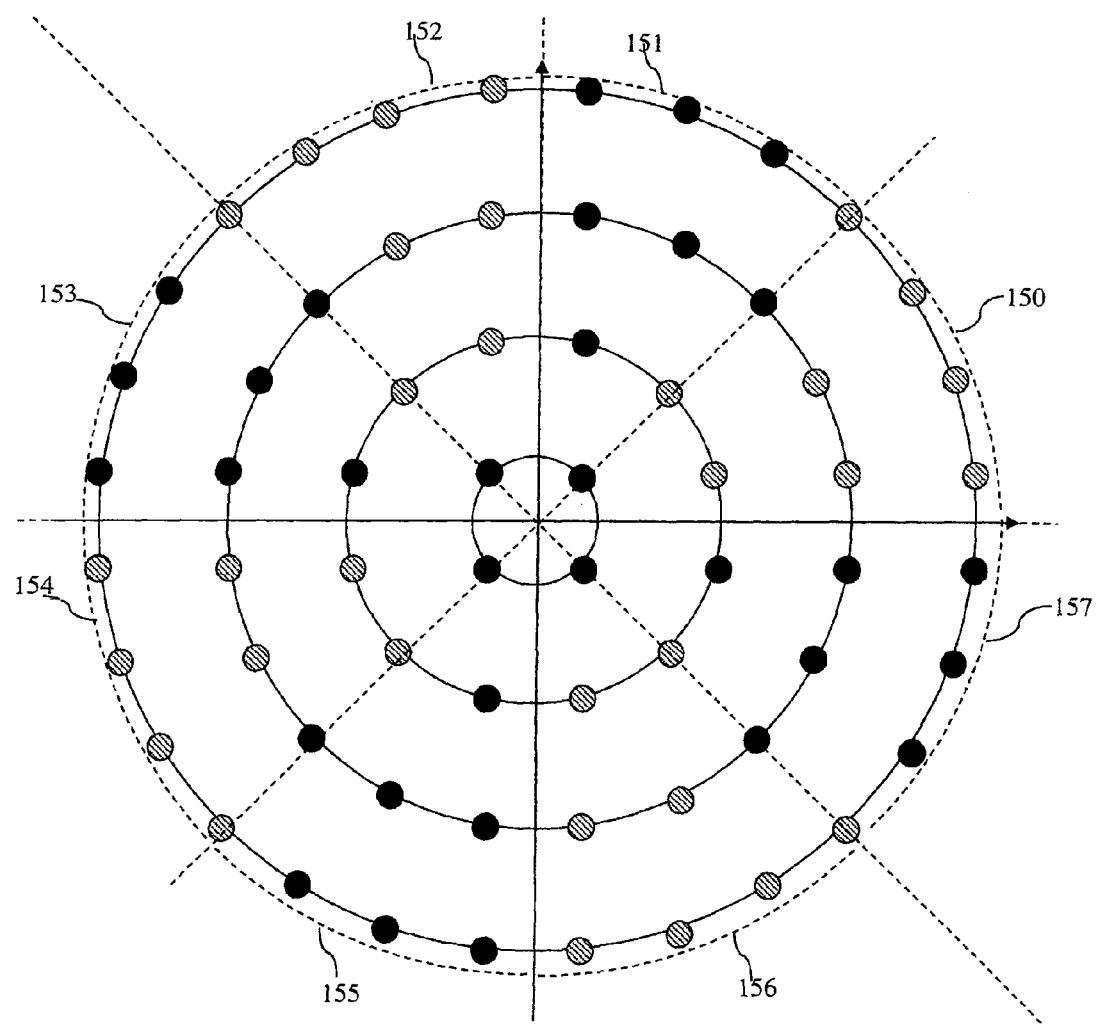

FIG. 3a discloses a block diagram of components of the wireless interface of the source according to a first mode of realization of the present invention;

FIG. 3b discloses a block diagram of components of the wireless interface of the source according to a second mode of realization of the present invention;

FIG. 4 is a diagram representing the architecture of a receiver in which the present invention is implemented;

FIG. 5 discloses a block diagram of components of the wireless interface of the receiver according to the present invention;

FIG. 6 discloses an example of an algorithm executed by a source in order to determine a constellation according to the present invention;

FIG. 7 discloses an example of an algorithm executed by a source in order to map information bits onto a constellation according to the present invention;

FIG. 8 discloses an example of an algorithm executed by a receiver in order to decode information sent by using a constellation according to the present invention;

FIG. 9 discloses an example of a separation of a 64 Amplitude Phase Shift Keying constellation into four circle sectors;

FIG. 10 discloses the Amplitude Phase Shift Keying constellation separated into four circle sectors on which an angular restriction is applied;

FIG. 11 discloses the Amplitude Phase Shift Keying constellation separated into four circle sectors on which an angular restriction is applied and on which the rings radii of the constellation are modified according to the angular restriction;

FIG. 12 discloses an example of an Amplitude Phase Shift Keying constellation modified according to the present invention in a case where the angular restriction is equal to π/8;

FIG. 13 discloses an example of an Amplitude Phase Shift Keying constellation modified according to the present invention in a case where the angular restriction is equal to π/16;

FIG. 14 discloses an example of an Amplitude Phase Shift Keying constellation modified according to the present invention in a case where the angular restriction is equal to π/8 and wherein some constellation points of at least one ring are moved to another ring;

FIG. 15 discloses an example of a separation of a 64 Amplitude Phase Shift Keying constellation into eight circle sectors;

FIG. 16 discloses an example of a table that may be used according to the present invention.

Figure 1:
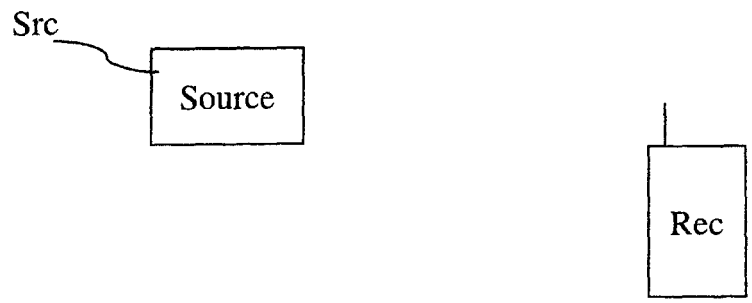
FIG. 1 represents a wireless link in which the present invention is implemented.

FIG. 1 represents a wireless link in which the present invention is implemented.

The present invention will be disclosed in an example in which the signals transferred by a source Src are transferred to receivers Rec.

For example, the source Src may be included in a satellite or in a terrestrial transmitter and broadcasts signals to receivers.

Only one receiver Rec is shown in the FIG. 1 for the sake of simplicity, but signals are broadcasted to a more important number of receivers Rec.

The receiver Rec may be a mobile terminal to which data like video signals are broadcasted.

According to the invention, the source Src transfers data to at least one receiver, data is decomposed in a first and a second streams, the source Src:

identifies, from a first number of bits of the first stream, a cluster of constellation points among clusters of constellation points of an amplitude phase shift keying constellation, each cluster of constellation points containing the same number of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to 2π/C where C is the number of clusters, all circle sectors of the first and second type having the same central point, identifies, from a second number of bits of the second stream, one constellation point out of the constellation points comprised in the identified cluster, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, maps the bits used for identifying to the identified constellation point of the identified cluster of constellation points, in order to form a symbol to be transmitted, transmits the symbol to the at least one receiver.

According to the invention, the receiver Rec:

receives at least one symbol, determines information related to the first stream from the received symbol and from the amplitude phase shift keying constellation, the constellation being divided into clusters of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to $2\pi/C$, where C is the number of clusters, all circles sectors of the first and second types having the same central point, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, decodes data of the first stream from the information related to the first stream.

The amplitude phase shift keying constellations used for transmission and reception are identical.

Figure 2:
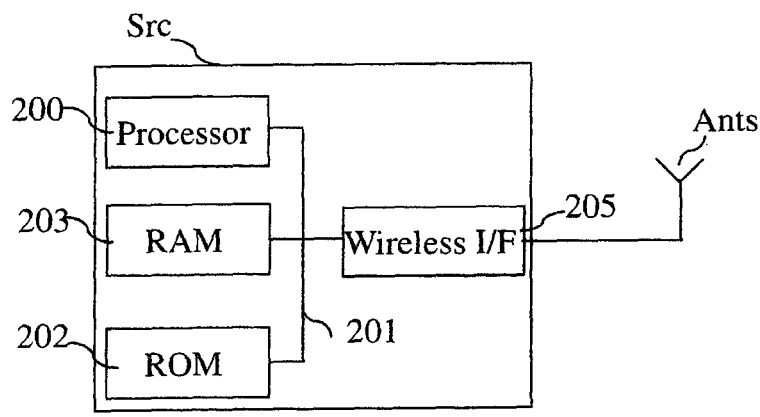
FIG. 2 is a diagram representing the architecture of a source in which the present invention is implemented.

FIG. 2 is a diagram representing the architecture of a source in which the present invention is implemented.

The source Src has, for example, an architecture based on components connected together by a bus 201 and a processor 200 controlled by the program as disclosed in FIGS. 6 and 7.

It has to be noted here that the source Src may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the programs related to the algorithms as disclosed in FIGS. 6 and 7 and may comprise plural amplitude phase shift keying constellations according to the present invention.

The processor 200 controls the operation of the wireless interface 205.

The read only memory 202 contains instructions of the programs related to the algorithms as disclosed in FIGS. 6 and 7, which are transferred, when the source Src is powered on, to the random access memory 203.

Any and all steps of the algorithms described hereafter with regard to FIGS. 6 and 7 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the source Src includes circuitry, or a device including circuitry, causing the source Src to perform the steps of the algorithms described hereafter with regard to FIGS. 6 and 7.

Such a device including circuitry causing the source Src to perform the steps of the algorithms described hereafter with regard to FIGS. 6 and 7 may be an external device connectable to the source Src.

The wireless interface 205 comprises components as disclosed in FIG. 3a or 3b.

FIG. 3a discloses a block diagram of components of the wireless interface of the source according to a first mode of realization of the present invention.

In the first mode of realization, a narrowband single carrier transmission scheme is used.

Data to be transmitted are divided into a first HP and a second LP streams. The HP stream may comprise the essential information and the LP stream may comprise detailed information.

HP and LP bit streams can be independent, or some relationship can exist between the two bit streams. For example LP stream may encode differential information with respect to the information carried in the HP stream. Bit scrambling can optionally occur before the coding modules 300 and 301.

The ST1 code module 300 encodes the HP stream and the ST2 code module 301 encodes the LP stream. The ST1 code module 300 and the ST2 code module 301 may optionally comprise interleaving modules. The two code modules 300 and 301 may employ the same or different codes and/or coding rates. Coding with rate 1 may be equivalent to uncoded transmission; in this case the coding module may be omitted.

The encoded HP and LP streams are provided to a constellation mapping module 302. The constellation mapping module 302 comprises a cluster identification module 303 which identifies, from bits of the encoded HP stream, clusters of constellation points. Examples of clusters of constellation points will be given in reference to FIGS. 9 and 15. The cluster identification module 303 partitions encoded HP streams into groups of $n_1$ bits and identifies, for each group of $n_1$ bits, a cluster of constellation points among clusters of constellation points of the amplitude phase shift keying constellation.

Each cluster of constellation points contains the same number of constellation points. Each cluster of constellation points is comprised in a respective circle sector of a first type. Each circle sector of the first type is spaced from another circle sector of the first type by a circle sector of a second type. The circle sectors of the second type do not comprise any constellation points and have a same central angle which is superior to null value and inferior to $2\pi/C$ where C is the number of clusters.

For example, if C=8, circle sectors of the second type have the same central angle which is superior to null value and may be inferior to $\pi/8$.

All circle sectors of first and second types have the same central point, which is also the central point of the amplitude phase shift keying constellation.

The constellation mapping module 302 comprises a constellation point identification module 304 which identifies, from bits of the encoded LP stream, constellation points. The constellation point identification module 304 partitions encoded LP streams into groups of $n_2$ bits and identifies, for each group of $n_2$ bits, a constellation point of the cluster of constellation points identified by the mapping module 303.

The constellation points are set on plural rings. The ring radii are dependent of the central angle of the circle sectors of the second type. The central angle of the circle sectors of the second type is the difference between the phase difference between the closest two constellation points on the same ring and belonging to two different circle sectors of the first type separated by one circle sector of the second type and the phase difference between the closest two constellation points on said same ring and belonging to the same circle sector of the first type.

The mapping module 302 maps groups of n'=$n_1$+$n_2$ bits composed respectively of $n_1$ bits of the HP stream and $n_2$ bits of the LP stream to the identified constellation point of the identified cluster of constellation points, in order to form a symbol to be transmitted.

The result of the mapping of the HP and LP streams is provided to a frame builder 305.

The frame builder 305 inserts the constellation symbols into transmission frames corresponding to the chosen transmission format and inserts all other necessary symbols such as, for example, pilots for channel estimation etc. . . . .

The output of the frame builder 305 may be provided to an optional prefix/postfix insertion module 306 before transmission.

The output of the frame builder or the output of the prefix/postfix insertion module 306 is then ready for transmission.

FIG. 3b discloses a block diagram of components of the wireless interface of the source according to a second mode of realization of the present invention.

In the second mode of realization, a multi-carrier transmission scheme such as SC-FDMA (Single-carrier Frequency Division Multiple Access), OFDMA (Orthogonal Frequency-Division Multiple Access), MC-CDMA (Multi Carrier-Code Division Multiple access) or other precoded OFDMA may be used.

Data to be transmitted are divided into a first HP and a second LP streams. The HP stream may comprise the essential information and the LP stream may comprise detailed information.

HP and LP bit streams can be independent, or some relationship can exist between the two bit streams. For example LP stream may encode differential information with respect to the information carried in the HP stream. Bit scrambling can optionally occur before the coding modules 350 and 351.

The ST1 code module 350 encodes the HP stream and the ST2 code module 351 encodes the LP stream. The ST1 code module 350 and the ST2 code module 351 may optionally comprise interleaving modules. The two code modules 350 and 351 may employ the same or different codes and/or coding rates. Coding with rate 1 may be equivalent to uncoded transmission; in this case the coding module may be omitted.

The encoded HP and LP streams are provided to a constellation mapping module 352. The constellation mapping module 352 comprises a cluster identification module 353 which identifies, from bits of the encoded HP stream, clusters of constellation points. Examples of clusters of constellation points will be given in reference to FIGS. 9 and 15. The cluster identification module 353 partitions encoded HP streams into groups of $n_1$ bits and identifies, for each group of $n_1$ bits, a cluster of constellation points among clusters of constellation points of the amplitude phase shift keying constellation.

Each cluster of constellation points contains the same number of constellation points. Each cluster of constellation points is comprised in a respective circle sector of a first type. Each circle sector of the first type is spaced from another circle sector of the first type by a circle sector of a second type. The circle sectors of the second type do not comprise any constellation points and have a same central angle which is superior to null value and inferior to 2π/C where C is the number of clusters.

For example, if C=8, circle sectors of the second type have the same central angle which is superior to null value and may be inferior to 7π/8.

All circle sectors of first and second types have the same central point, which is also the central point of the amplitude phase shift keying constellation.

The constellation mapping module 352 comprises a constellation point identification module 354 which identifies, from bits of the encoded LP stream, constellation points. The constellation point identification module 354 partitions encoded LP streams into groups of $n_2$ bits and identifies, for each group of $n_2$ bits, a constellation point of the cluster of constellation points identified by the mapping module 353.

The constellation points are set on plural rings. The ring radii are dependent of the central angle of the circle sectors of the second type. The central angle of the circle sectors of the second type is the difference between the phase difference between the closest two constellation points on the same ring and belonging to two different circle sectors of the first type separated by one circle sector of the second type and the phase difference between the closest two constellation points on said same ring and belonging to the same circle sector of the first type.

The mapping module 352 maps groups of n'=$n_1$+$n_2$ bits composed respectively of $n_1$ bits of the HP stream and $n_2$ bits of the LP stream to the identified constellation point of the identified cluster of constellation points, in order to form a symbol to be transmitted.

If the transmission scheme is SC-FDMA, the result of the mapping of the HP and LP streams is provided to a DFT module 355 (Discrete Fourier Transform) which spreads in the frequency domain the result of the mapping of the HP and LP streams. The DFT module 355 may be replaced by a Fast Fourier Transform module.

The DFT module 355 may be absent, case in which we obtain OFDMA transmission.

The DFT module 355 may be replaced by a Walsh Hadamard module to obtain MC-CDMA transmission.

The DFT module 355 may be replaced by other type of precoding module to obtain precoded OFDMA transmission.

The precoded data symbols are mapped on subcarriers by a subcarrier mapping module 356.

The output of the subcarrier module 356 is provided to an IDFT module 357 (Inverse Discrete Fourier Transform) of size superior or equal to the size of the DFT module 355.

In a variant, The IDFT module 357 may be replaced by an Inverse Fast Fourier Transform module or other processing module.

The output of the IDFT module 357 may be provided to an optional prefix/postfix insertion module 358 before transmission.

The output of the IDFT module 357 or the output of the prefix/postfix insertion module 306 is then ready for a transmission like for example a broadcast.

FIG. 4 is a diagram representing the architecture of a receiver in which the present invention is implemented.

The receiver Rec has, for example, an architecture based on components connected together by a bus 401 and a processor 400 controlled by the program as disclosed in FIG. 8.

It has to be noted here that the receiver Rec may have an architecture based on dedicated integrated circuits.

The bus 401 links the processor 400 to a read only memory ROM 402, a random access memory RAM 403 and a wireless interface 405.

The memory 403 contains registers intended to receive variables and the instructions of the program related to the algorithm as disclosed in FIG. 8 and may comprise plural amplitude phase shift keying constellations according to the present invention.

The processor 400 controls the operation of the wireless interface 405.

The read only memory 402 contains instructions of the program related to the algorithm as disclosed in FIG. 8, which are transferred, when the receiver Rec is powered on, to the random access memory 403.

Any and all steps of the algorithms described hereafter with regard to FIG. 8 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver Rec includes circuitry, or a device including circuitry, causing the receiver Rec to perform the steps of the algorithm described hereafter with regard to FIG. 8.

Such a device including circuitry causing the receiver Rec to perform the steps of the algorithm described hereafter with regard to FIG. 8 may be an external device connectable to the source Src.

The wireless interface 405 comprises components as disclosed in FIG. 5.

FIG. 5 discloses a block diagram of components of the wireless interface of the receiver according to the present invention.

The wireless interface 405 comprises a synchronization module 500 which synchronizes the received signals.

The wireless interface 405 may comprise an optional prefix/postfix removal module 501.

The output of the prefix/postfix removal module 501 is provided to a DFT module 502.

The output of the DFT module 502 is provided to an equalization module 503 and to a channel estimation module 504. The channel estimation module 504 is providing information to the equalization module 503.

The output of the equalization module 503 is provided to an IDFT module 505.

When the receiver REC decodes a single carrier signal like the one generated in FIG. 3a, modules 502 and 505 are either both present (equalization in the frequency domain) or both absent (equalization in the time domain).

When the receiver decodes a multi-carrier signal like the one generated in FIG. 3b, IDFT module 505 may either be present (SC-FDMA), or absent (OFDMA) or be replaced by another type of processing which reverses the effect of the precoding module 355. For example, for MC-CDMA transmission, IDFT module 505 is replaced with an inverse Walsh Hadamard module.

The output of the IDFT module 505 is provided to a demodulation module 506.

If there is no IDFT module or de-spreading module, the output of the equalization module 503 is directly provided to the demodulation module 506.

The demodulating module 506 provides information related to the HP stream to a HP decoding module 507.

The demodulating module 506 determines information related to the HP stream from the received symbol and from the amplitude phase shift keying constellation. The constellation is divided into clusters of constellation points and each cluster of constellation points is comprised in a respective circle sector of a first type. Each circle sector of the first type is spaced from another circle sector of the first type by a circle sector of a second type. Circle sectors of the second type do not comprise any constellation points and have the same central angle which is superior to null value and inferior to $2\pi/C$, where C is the number of clusters. All circles sectors of the first and second types having the same central point. The constellation points are set on plural rings, the ring radii being dependent of the central angle of the circle sectors of the second type.

The central angle of the circle sectors of the second type is the difference between the phase difference between the closest two constellation points on the same ring and belonging to two different circle sectors of the first type separated by one circle sector of the second type and the phase difference between the closest two constellation points on said same ring and belonging to the same circle sector of the first type.

The decoding module 507 decodes data of the HP stream from the information related to the HP stream.

Information related to the HP stream may be soft bits.

The demodulating module 506 provides information related to the LP stream to a LP decoding module 509.

The demodulating module 506 determines information related to the LP stream from the received symbol and from the amplitude phase shift keying constellation.

The LP decoding module 509 decodes data of the LP stream from the information related to the LP stream.

Information related to the LP stream may be soft bits.

At the receiver side, a possibility is to simultaneously decode both the HP and LP streams. Simultaneous decoding of both streams is possible, especially when the information on the cluster brings about little improvement on the decoding of the LP stream. Other decoder configurations can be used like feedback from the HP decoder to the LP decoder, or iterative decoding.

It has to be noted here that the receiver Rec may not comprise an LP decoding module 509 and may decode only the HP stream.

FIG. 6 discloses an example of an algorithm executed by a source in order to determine a constellation according to the present invention.

More precisely, the present algorithm is executed by the processor 200 of the source Src.

At step S60, the processor 200 obtains a X-APSK constellation (Amplitude Phase Shift Keying) with M rings, each k-th ring containing $N_k$ constellation points, k=1 . . . M. For example, if X=64, we have a 64-APSK constellation. An example of a 64 APSK constellation is given in FIG. 9 or 15. Constellations in FIGS. 9 and 15 are uniform APSK constellations. In a variant, at step S60, the processor 200 may select a non-uniform APSK constellation.

At next step S61, the processor 200 separates the 64-APSK constellation into circle sectors. For example, the processor 200 separates the 64-APSK constellation into $C=4=2^{n_1=2}$ circle sectors as shown in FIG. 9.

FIG. 9 discloses an example of a separation of a 64 Amplitude Phase Shift Keying constellation into four circle sectors.

The four circle sectors are noted 90, 91, 92 and 93 in FIG. 9.

The 64 APSK constellation given in the example of FIG. 9 is a 4-12-20-28 APSK constellation with M=4 rings. Since $X=64=2^{n'=6}$, groups of n'=6 coded bits are mapped onto each constellation symbol in the transmission process. $N_1=4$ is the number of constellation points of the first ring, i.e. the ring having the smallest radius $R_1$, $N_2=12$ is the number of constellation points of the second ring of radius $R_2$, $N_3=20$ is the number of constellation points of the third ring of radius $R_3$ and $N_4=28$ is the number of constellation points of the fourth ring of radius $R_4$, i.e. the ring having the largest radius.

Each circle sector corresponds to a cluster of constellation points, each cluster contains $2^{n_2=4}=16$ constellation points. This is equivalent to constellation splitting in C=4 clusters of 16 points each. Consequently, out of the n'=6 coded bits mapped onto a constellation symbol, $n_1=2$ bits belong to the HP stream and $n_2=4$ bits to the LP stream.

At next step S62, the processor 200 checks if there is at least one constellation point which falls onto a circle sector border.

For a separation as shown in FIG. 9, no constellation point falls onto a circle sector border.

It has to be noted here that in the example given in reference to FIG. 15, some constellation points fall onto circle sector borders.

If there is at least one constellation point which falls onto a circle sector border, the processor 200 moves to step S63. Otherwise, the processor 200 moves to step S64.

At step S63, the processor 200 decides to which cluster constellation points which fall onto a circle sector border belong to, taking into account that all clusters should have the same number of points, $2^{n_2}$.

FIG. 15 discloses an example of a separation of a 64 Amplitude Phase Shift Keying constellation into eight circle sectors.

Since $X=64=2^{n'=6}$, groups of n'=6 coded bits are mapped onto each constellation symbol in the transmission process.

The eight circle sectors are noted 150, to 157 in FIG. 15. Each circle sector corresponds to a cluster of constellation points. Since there are 8 circle sectors, we have $C=2^{n_1=3}=8$ clusters of constellation points, each cluster containing $2^{n_2=n'-n_1=3}=8$ constellation points. This is equivalent to constellation splitting in C=8 clusters of 8 points each. Consequently, out of the n'=6 coded bits mapped onto a constellation symbol, $n_1=3$ bits belong to the HP stream and $n_2=3$ bits to the LP stream.

Points comprised between the circle sector 150 and 151 fall onto a circle sector border, points comprised between the circle sector 152 and 153 fall onto a circle sector border, points comprised between the circle sector 154 and 155 fall onto a circle sector border and points comprised between the circle sector 156 and 157 fall onto a circle sector border.

The hashed points on the circle sector border between 150 and 151 belong to the circle sector 150. The black points in the circle sector border between 150 and 151 belong to the circle sector 151.

The hashed points on the circle sector border between 152 and 153 belong to the circle sector 152. The black points in the circle sector border between 152 and 153 belong to the circle sector 153.

The hashed points on the circle sector border between 154 and 155 belong to the circle sector 154. The black points in the circle sector border between 154 and 155 belong to the circle sector 155.

The hashed points on the circle sector border between 156 and 157 belong to the circle sector 156. The black points in the circle sector border between 156 and 157 belong to the circle sector 157.

Once the step S63 is executed, the processor 200 moves to step S64.

Other types of decisions can be made, as long as all the clusters of constellation points have the same number of constellation points.

At step S64, the processor 200 selects and imposes an angular restriction θ along the circle sector borders. For example, the angular restriction has a value which is superior to null value and inferior to π/C.

For example, if C=8, circle sectors of the second type have the same central angle which is superior to null value and may be inferior to π/8.

The constellation parameter θ may be adapted in function of transmission conditions like for example weather conditions in the transmission regions. There are two possibilities: a set of possible θ values along with the corresponding constellation designs is pre-computed and stored in a, e.g., lookup table; or constellation redesign can be done in an adaptive manner during the transmission. In both cases the value of the used θ parameter needs to be transmitted to the receiver.

According to the example of FIG. 10, the processor 200 selects and imposes an angular restriction of θ=π/8 along the circle sector borders.

By imposing an angular restriction with an angle θ, circle sectors, not containing any constellation points are created between two circle sectors containing clusters of constellation points. The created circle sectors, named circle sectors of a second type, do not comprise any constellation points and have the same central angle 2θ which is superior to null value and inferior to 2π/C.

By applying an angular restriction along the circle sector borders, circle sectors of the first type are created. The constellation points comprised in clusters of constellation points corresponding to circle sectors at step S61 are still in clusters of constellation points in their respective circle sector of first type once the angular restriction is applied i.e. the distance separating constellation points on respective rings in each circle sector of the first type is then reduced in comparison with the distance separating constellation points in circle sectors at step S61.

FIG. 10 discloses the Amplitude Phase Shift Keying constellation separated into four circle sectors on which an angular restriction is applied.

After having applied the angular restriction, a non-uniform APSK constellation is obtained.

Here, an angular restriction of θ=π/8 is imposed.

Each circle sector border is rotated towards the center of its circle sector by θ=η/8.

The phase difference between two (out of the $N_k$) constellation points on the k-th ring of radius $R_k$ k=1 ... M and belonging to the same cluster is reduced from $\phi_k=2\pi/N_k$ before angular restriction to $$\varphi'_k = \left(\frac{2\pi}{C} - 2\theta\right) \bigg/ \frac{N_k}{C} = \frac{2\pi - 2C\theta}{N_k}$$

after the angular restriction.

Let $\phi'_{k,c}(n)$ be the phase of the constellation point of index n on the k-th ring (counterclock counting, starting with index 0 at the constellation point in the first quadrant having the lowest phase) and being attributed to cluster c, c=0 . . . C−1.

$\phi'_{k,c}(n)=\phi_k+n\phi'_k+2\theta c$, where $\phi_k=\phi'_{k,0}(0)$ is the phase of the first constellation point of ring k (after angular restriction) with respect to the real axis.

If constellation points on the same ring and of indexes n and n+1 lie in the same cluster c, then $\phi'_k=\phi'_{k,c}(n+1)-\phi'_{k,c}(n)$.

In the example of FIG. 9, the constellation is symmetrical with respect to the circle sector borders and all $N_k$ are divisible by the number of clusters C. Therefore, in this symmetrical specific case, in FIG. 9, after angular restriction, we can omit index c and compute $\phi'_k(n)$ as:

$$\varphi'_k(n) = \frac{2\pi}{C}\text{floor}\left(\frac{n}{N_k/C}\right) + \theta + \frac{2\pi - 2C\theta}{N_k}\left(\frac{1}{2} + n\,\text{mod}\,\frac{N_k}{C}\right)$$

At next step S65, the processor 200 computes new ring radii $R'_k$ in function of parameter $\theta$ and constellation parameters $N_k$.

In order to have a more uniform distribution between the constellation points within a cluster, the interring distance can be readjusted, leading to some constellation resealing and thus to computing new corresponding ring radii. $R'_k$. The new constellation will have $N_k$ points on each ring of radius $R'_k$. By lowering the interring distance, the PAPR is reduced (Peak-to-Average Power Ratio).

The interring distance should not be lower than the intra-ring distance in order not to modify the minimum Euclidean distance between constellation points and severely degrade the BER (Bit Error Rate) performance.

The interring distance is the distance separating to neighboring rings and the intra-ring distance on a given ring is the distance separating to neighboring constellation points on that given ring.

The interring distance should not be too high in order not to penalize the PAPR. The interring distance should not be too low in order not to penalize and the performance of the HP stream.

Let us assume that the four constellation rings are equally spaced and denote by $\Delta$ the interring distance. Let us also denote by $\Delta_k$ the minimum intraring distance between two constellation points of ring k.

Intraring distance $\Delta_k$ can be expressed as:

$\Delta_k = \sqrt{2R'^2_k(1-\cos\phi'_k)}, k=1\ldots 4,$ $\Delta$ should be at least equal to the minimum intra-ring distance between constellation points.

With the assumption that the constellation rings are equally spaced, in order to compute the radii corresponding to the rescaled constellation and thus the interring distance $\Delta$, the following constraints may be taken into account:

$$\begin{cases} \sum_{k=1}^M N_k R'^2_k = X \\ R'_k = R'_1 + (k-1)\Delta, k=2,\ldots,M \end{cases}$$

The equation giving the value of $\Delta_k$ can be further rewritten as:

$$\Delta_k = \sqrt{2(R'_1 + (k-1)\Delta)^2\left(1 - \cos\frac{2\pi - 2C\theta}{N_k}\right)}$$

When M=4 and X=64, $64R'^2_1 + (2N_2+4N_3+6N_4)\Delta R'_1 + (N_2+4N_3+9N_4)\Delta^2 - 64 = 0$ Choosing $\Delta=\Delta_k$ gives $\Delta$ as a function of $R_1'$. This allows to compute the value of $R_1'$.

For the considered 4-12-20-28 APSK constellation given in FIG. 9, the minimum intra-ring distance between constellation points corresponds to the $4^{th}$ ring $\Delta_4$ as shown in FIG. 11.

FIG. 11 discloses the Amplitude Phase Shift Keying constellation separated into four circle sectors on which an angular restriction is applied and on which the rings radii of the constellation are modified according to the angular restriction.

In the example of FIG. 11, the 64 APSK constellation has an angular restriction of $\theta=\pi/8$ and interring distance $\Delta$ is chosen equal to the minimum intra-cluster intraring distance, which in the current case is $\Delta_4$.

By minimizing the value of $\Delta$, this design strives for a low PAPR, but some performance penalty may arise from the fact that the average Euclidean distance between constellation points within a cluster corresponding to the LP stream is reduced. Other values of $\Delta$, such as choosing $\Delta=\Delta_2$ for example, will perform different trade-offs between PAPR and BER performance.

FIG. 12 discloses an example of an Amplitude Phase Shift Keying constellation separated into four circle sectors and modified according to the present invention in a case where the angular restriction is equal to $\pi/8$.

In the example of FIG. 12, the 64 APSK constellation has an angular restriction of $\theta=\pi/8$ and interring distance $\Delta$ is chosen equal to the maximum intra-cluster intraring distance, which in the current case is $\Delta_2$.

FIG. 13 discloses an example of an Amplitude Phase Shift Keying constellation separated into four circle sectors and modified according to the present invention in a case where the angular restriction is equal to $\pi/16$.

In the example of FIG. 13, the 64 APSK constellation has an angular restriction of $\theta=\pi/16$ and interring distance $\Delta$ is chosen equal to the maximum intra-cluster intraring distance, which in the current case is $\Delta_2$.

Once step S65 is performed, the present algorithm is interrupted or according to a particular mode of realization of the present invention, the processor 200 executes further step S66.

Examples of constellation parameters are given in FIG. 16.

FIG. 16 discloses an example of a table that may be used according to the present invention.

In the column 160, different values of the radius of the first ring are shown.

In the column 161, different values of the radius of the second ring are shown.

In the column 162, different values of the radius of the third ring are shown.

In the column 163, different values of the radius of the fourth ring are shown.

The line 165 shows an angular restriction of $\theta=\pi/8$ and the interring distance is $\Delta=0.1226$. The radius of the first ring is equal to 0.7251, the radius of the second ring is equal to 0.8477, the radius of the third ring is equal to 0.9702 and the radius of the fourth ring is equal to 1.0928.

The line 166 shows an angular restriction of $\theta=\pi/8$ and the interring distance is $\Delta=0.1958$. The radius of the first ring is equal to 0.5542, the radius of the second ring is equal to 0.75, the radius of the third ring is equal to 0.9458 and the radius of the fourth ring is equal to 1.1416.

The line 167 shows an angular restriction of $\theta=\pi/16$ and the interring distance is $\Delta=0.1915$. The radius of the first ring is equal to 0.5615, the radius of the second ring is equal to 0.7560, the radius of the third ring is equal to 0.9474 and the radius of the fourth ring is equal to 1.1389.

The line 168 shows an angular restriction of $\theta=\pi/16$ and the interring distance is $\Delta=0.2585$. The radius of the first ring is equal to 0.4040, the radius of the second ring is equal to 0.6624, the radius of the third ring is equal to 0.9209 and the radius of the fourth ring is equal to 1.1794.

It has to be noted here that values of radii given in FIG. 16 are nominal values for a constellation normalized at a unitary mean power. According to the invention, values of radii given in FIG. 16 for a constellation normalized at a unitary mean power may vary at most of +/−5%.

Other transmission power than unitary power may be used according to the present invention. In that case, values of radii are proportionally modified in order to obtain the desired transmission power.

At step S66, the processor 200 decides whether a new number of constellation points per ring $N'_k$ needs to be computed, for example using a threshold-based decision in function of constellation parameters.

If a new number of constellation points per ring $N'_k$ is decided, parameters $R'_k$, $\Delta$, $\Delta_k$ need to be computed again for a given $\theta$.

When choosing low interring distance, re-allocating the number of constellation points per ring may relax the intraring spacing and lead to a constellation with higher average Euclidean distance. This has a positive impact on the BER performance, especially for the LP stream.

Decision can be made in several manners.

For example, the processor 200 may compare the interring distance $\Delta$ to the max $\Delta_k$. For example, if the difference max $\Delta_k-\Delta$ is superior to a predetermined threshold, or if the result of the division max $\Delta_k/\Delta$ is superior to a certain threshold, the processor 200 may decide to move a predetermined number of constellation points, e.g. 4 points, C points, etc, from the ring having the highest number of constellation points to the ring having the lowest number of constellation points, or from the ring having the smallest $\Delta_k$ to the ring having the lowest number of constellation points, or to the ring having the highest $\Delta_k$ or to the ring having the highest $\Delta_k$ measured within a same cluster, or to the ring having the highest inter-cluster distance. It has to be noted here that other types of criteria may be employed.

The processor 200 may exclude those rings for which intraring distance is not computed between points corresponding to a same cluster. In the example given in FIG. 14 and obtained by moving points of the constellation presented in FIG. 11; $\Delta_1$ is excluded since it is computed based on distances between points corresponding to different clusters. The interring distance $\Delta$ is compared to the to the maximum intraring distance computed between constellation points within the same cluster $\Delta_2$. The processor 200 can then decide to move a predetermined number of constellation points (e.g. 4 points, C points, etc) from the ring having the highest number of constellation points to the ring having the lowest number of constellation points, including or not the rings excluded in the process of threshold decision. For example, here we include ring 1 and 4 points are moved from ring 4 to ring 1.

Once this step is concluded, the number of constellation points per ring changes and becomes $N'_k$. The processor 200 rebuilds an uniform constellation having or not the same radii $R_k$ as the original constellation and having $N'_k$ points per ring.

FIG. 14 discloses an example of an Amplitude Phase Shift Keying constellation modified according to the present invention in a case where the angular restriction is equal to $\pi/8$ an wherein some constellation points of at least one ring are moved to another ring.

In the example of FIG. 14, the 64 APSK constellation has an angular restriction of $\theta=\pi/8$ and the interring distance is chosen equal to the minimum intraring distance, in this case $\Delta_4$ and four constellation points of the fourth ring are moved to the first ring.

The first ring has $N'_1=8$ constellation points, the second ring has $N'_2=12$ constellation points, the third ring has $N'_3=20$ constellation points, the fourth ring has $N'_4=24$ constellation points. After ring radii re-computation the radius of the first ring is equal to 0.6972, the radius of the second ring is equal to 0.8473, the radius of the third ring is equal to 0.9974, the radius of the fourth ring is equal to 1.1475 and $\Delta$ is equal to 0.1501.

FIG. 7 discloses an example of an algorithm executed by a source in order to map bits onto a constellation according to the present invention.

More precisely, the present algorithm is executed by the processor 200 of the source Src.

At step S70, the processor 200 selects one amplitude phase shift keying constellation among plural amplitude phase shift keying constellations which are, for example, stored in the RAM memory 203. For example each amplitude phase shift keying constellation corresponds to a given angular restriction $\theta$ and/or to different values of C.

The constellation parameter $\theta$ or C may be adapted in function of transmission conditions like for example weather conditions in the transmission regions.

It has to be noted here that in a variant, the amplitude phase shift keying constellation is predetermined. In such variant, the selected amplitude phase shift keying constellation is the predetermined amplitude phase shift keying constellation.

At next step S71, the processor 200 identifies, from bits of the encoded HP stream, clusters of constellation points. The processor 200 partitions encoded HP streams into groups of $n_1$ bits and identifies, for each group of $n_1$ bits, a cluster of constellation points among clusters of constellation points of the amplitude phase shift keying constellation.

Each cluster of constellation points contains the same number of constellation points. Each cluster of constellation points is comprised in a respective circle sector of a first type. Each circle sector of the first type is spaced from another circle sector of the first type by a circle sector of a second type. The circle sectors of the second type do not comprise any constellation points and have a same central angle which is superior to null value and inferior to $2\pi/C$ where C is the number of clusters.

For example, if C=8, circle sectors of the second type have the same central angle which is superior to null value and may be inferior to $\pi/8$.

All circle sectors of first and second types have the same central point, which is also the central point of the amplitude phase shift keying constellation.

At step S72, the processor 200 identifies, from bits of the encoded LP stream, constellation points. The processor 200 partitions encoded LP streams into groups of $n_2$ bits and identifies, for each group of $n_2$ bits, a constellation point of the cluster of constellation points identified at step S71.

The constellation points are set on plural rings. The ring radii are dependent of the central angle of the circle sectors of the second type. The central angle of the circle sectors of the second type is the difference between the phase difference between the closest two constellation points on the same ring and belonging to two different circle sectors of the first type separated by one circle sector of the second type and the phase difference between the closest two constellation points on said same ring and belonging to the same circle sector of the first type.

At step S73, the processor 200 maps groups of $n'=n_1+n_2$ bits composed respectively of $n_1$ bits of the HP stream and $n_2$ bits of the LP stream to the identified constellation point of the identified cluster of constellation points, in order to form a symbol to be transmitted.

For example, for a 64 APSK constellation partitioned into C=4 clusters of 16 points each, $n_1$ is equal to two and $n_2$ is equal to four and groups of $n'=n_1+n_2=6$ bits are mapped onto each constellation point.

Let us assume a particular example of bit to constellation mapping, suitable for the particular case of a constellation separated in C=4 clusters. For example, let us assume that in the process of bit to constellation mapping the first two bits correspond to the HP stream and the last four bits correspond to the LP stream. This is a particular example, in the general case the bits of the LP stream do not necessarily appear in the first $n_1$ positions.

Let us also assume that all groups of n'=6 bits having the first $n_1$=2 bits with values 00 map onto symbols in the circle sector noted 110 in FIG. 11, that all groups of n'=6 bits having the first $n_1$=2 bits with values 10 map onto symbols in the circle sector noted 111 in FIG. 11, that all groups of n'=6 bits having the first $n_1$=2 bits with values 11 map onto symbols in the circle sector noted 112 in FIG. 11, and that all groups of n'=6 bits having the first $n_1$=2 bits with values 01 map onto symbols in the circle sector noted 113 in FIG. 11. More particularly, let us assume that the group of bits 101110 is mapped onto the constellation point noted 114 in FIG. 11, the group of bits 101000 is mapped onto the constellation point noted 115 in FIG. 11 and the group of bits 001000 is mapped onto the constellation point noted 116 in FIG. 11. With this particular mapping, for the HP stream, a binary value of 00 identifies the cluster of constellation points derived from the circle sector noted 110 in FIG. 11, a binary value of 10 identifies the cluster of constellation points derived from the circle sector noted 111 in FIG. 11, a binary value of 11 identifies the cluster of constellation points derived from the circle sector noted 112 in FIG. 11 and a binary value of 01 identifies the cluster of constellation points derived from the circle sector noted 113 in FIG. 11.

The processor 200 processes symbols as disclosed in FIG. 3a or as in FIG. 3b.

FIG. 8 discloses an example of an algorithm executed by a receiver in order to decode information sent by using the symbols of a constellation according to the present invention.

More precisely, the present algorithm is executed by the processor 400 of the receiver Rec.

At step S80, the processor 400 selects one amplitude phase shift keying constellation among plural amplitude phase shift keying constellations which are, for example stored in the RAM memory 403. For example each amplitude phase shift keying constellation corresponds to a given angular restriction θ and/or to different values of C.

For example, the receiver Rec receives from the source Src, information indicating which amplitude phase shift keying constellation is used by the source Src for transferring data. The receiver Rec selects the same as the one used by the source Src.

It has to be noted here that in a variant, the amplitude phase shift keying constellation is predetermined. In such variant, the selected amplitude phase shift keying constellation is the predetermined amplitude phase shift keying constellation.

At least one symbol is received by the receiver Rec from the source Src.

At next step S81, the processor 400 demodulates the at least one received symbol and determines information related to the HP stream and eventually information related to the LP stream. The processor 400 determines data information related to the HP stream from the received symbol and from the amplitude phase shift keying constellation.

The constellation is divided into clusters of constellation points and each cluster of constellation points is comprised in a respective circle sector of a first type. Each circle sector of the first type is spaced from another circle sector of the first type by a circle sector of a second type. Circle sectors of the second type do not comprise any constellation points and have the same central angle which is superior to null value and inferior to $2\pi/C$, where C is the number of clusters. All circles sectors of the first and second types having the same central point. The constellation points are set on plural rings, the ring radii being dependent of the central angle of the circle sectors of the second type.

The central angle of the circle sectors of the second type is the difference between the phase difference between the closest two constellation points on the same ring and belonging to two different circle sectors of the first type separated by one circle sector of the second type and the phase difference between the closest two constellation points on said same ring and belonging to the same circle sector of the first type.

At next step S82, the processor 400 decodes data related to the HP stream.

At next step S83, the processor 400 decodes data related to the LP stream.

It has to be noted here that the step S83 may not be executed, for example when the receiver Rec has limited processing capabilities.

At the receiver side, a possibility is to simultaneously decode both the HP and LP streams. Simultaneous decoding of both streams is possible, especially when the information on the cluster brings about little improvement on the decoding of the LP stream. Other decoder configurations can be used like feedback from the HP decoder to the LP decoder, or iterative decoding.

Naturally, many modifications can be made to the embodiments of the invention described above without departing from the scope of the present invention.

The invention claimed is:

1. Method for transmitting data to at least one receiver, data being decomposed in a first and a second streams, wherein the method comprises the steps of:

identifying, from a first number of bits of the first stream, a cluster of constellation points among clusters of constellation points of an amplitude phase shift keying constellation, each cluster of constellation points containing the same number of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to $2\pi/C$ where C is the number of clusters and is an integer greater than zero, all circle sectors of the first and second types having the same central point, identifying, from a second number of bits of the second stream, one constellation point out of the constellation points comprised in the identified cluster, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, mapping the bits of the first and second numbers of bits used for identifying to the identified constellation point of the identified cluster of constellation points, in order to form a is replaced by symbol to be transmitted, and transmitting the symbol to the at least one receiver.

2. Method according to claim 1, wherein the constellation points within a cluster and on the same ring are equally distanced, and in that the distance is the same among constellation points within a cluster on said same ring for all the clusters.

3. Method according to claim 1, wherein all the distances between two neighbouring rings are equal.

4. Method according to claim 2, wherein the distance between two rings is equal to one of the distances between neighbouring constellation points on a same ring.

5. Method according to claim 1, wherein the location of constellation points is obtained by:

separating the constellation points of an uniform amplitude phase shift keying constellation into clusters of constellation points, each cluster of constellation points containing the same number of constellation points, each cluster of constellation points being comprised in a circle sector, said circle sectors being contiguous, having the same central point and being separated by borders, applying an angular restriction along the circle sector borders in order to create circle sectors of the second type and circle sectors of the first type while keeping the constellation points contained in respective clusters of constellation points in the respective circle sectors of first type, and modifying the ring radii according to the central angle of the circle sectors of the second type.

6. Method according to claim 5, wherein if, in the process of separating the constellation points, at least one constellation point of the uniform amplitude phase shift keying constellation is comprised in two circle sectors, the method comprises a further step of allocating the at least one constellation point to one of the clusters of constellation points taking into account that each cluster of constellation points has the same number of constellation points.

7. Method according to claim 5, wherein the method comprises a further step of moving constellation points of one ring to at least one other ring.

8. Method according to claim 1, wherein the method comprises further step of selecting one amplitude phase shift keying constellation among plural amplitude phase shift keying constellations.

9. Method for receiving data transmitted by a source, data being decomposed in a first and a second streams and transferred using an amplitude phase shift keying constellation, wherein the method, executed by a receiver, comprises the steps of:

receiving at least one symbol, determining information related to the first stream from the received symbol and from the amplitude phase shift keying constellation, the constellation being divided into clusters of constellation points, each cluster of constellation points being comprised in a respective circle sector of a first type, each circle sector of the first type being spaced from another circle sector of the first type by a circle sector of a second type, each circle sector of the second type not comprising any constellation points and having a same central angle which is superior to null value and inferior to $2\pi/C$, where C is the number of clusters and is an integer greater than zero, all circles sectors of the first and second types having the same central point, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, and decoding data of the first stream from the information related to the first stream.

10. Method according to claim 9, wherein the method comprises further step of:

determining information related to the second stream from the received symbol and from the amplitude phase shift keying constellation, and decoding data of the second stream from the information related to the second stream.

11. Method according to claim 9, wherein the method comprises further step of selecting one amplitude phase shift keying constellation among plural amplitude phase shift keying constellations.

12. Device for transmitting data to at least one receiver, data being decomposed in a first and a second streams, wherein the device comprises:

means for identifying, from a first number of bits of the first stream, a cluster of constellation points among clusters of constellation points of an amplitude phase shift keying constellation, each cluster of constellation points containing the same number of constellation points, each cluster of constellation points being comprised in a respective circle sector of a first type, each circle sector of the first type being spaced from another circle sector of the first type by a circle sector of a second type, each circle sector of the second type not comprising any constellation points and having the same central angle which is superior to null value and inferior to $2\pi/C$ where C is the number of clusters and is an integer greater than zero, all circle sectors of the first and second type having the same central point, means for identifying, from a second number of bits of the second stream, one constellation point out of the constellation points comprised in the identified cluster, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, means for mapping the bits of the first and second numbers of bits used for identifying to the identified constellation point of the identified cluster of constellation points, in order to form a symbol to be transmitted, and means for transmitting the symbol to the at least one receiver.

13. Device for receiving data from a source, data being decomposed in a first and a second streams and transferred using an amplitude phase shift keying modulation, wherein the device comprises:

means for receiving at least one symbol, means for determining information related to the first stream from the received symbol and from the amplitude phase shift keying constellation, the constellation being divided into clusters of constellation points, each cluster of constellation points being comprised in a respective circle sector of a first type, each circle sector of the first type being spaced from another circle sector of the first type by a circle sector of a second type, each circle sector of the second type not comprising any constellation points and having the same central angle which is superior to null value and inferior to $2\pi/C$, where C is the number of clusters and is an integer greater than zero, all circles sectors of the first and second types having the same central point, the constellation points being set on plural rings, the ring radii being dependent of the central angle of the circle sectors of the second type and the central angle of the circle sectors of the second type being the difference between the phase difference between the closest two constellation points on the same ring and belonging to two different circle sectors of the first type separated by one circle sector of the second type and the phase difference between the closest two constellation points on said same ring and belonging to the same circle sector of the first type, and means for decoding data of the first stream from the information related to the first stream.

* * * * *